United States Patent Office 3,740,331
Patented June 19, 1973

3,740,331
METHOD FOR PRECIPITATION OF HEAVY METAL SULFIDES
John R. Anderson, Cranbury, and Charles O. Weiss, Princeton, N.J., assignors to Sybron Corporation, Rochester, N.Y.
No Drawing. Filed June 23, 1971, Ser. No. 156,085
Int. Cl. C02b 1/20
U.S. Cl. 210—53                          8 Claims

ABSTRACT OF THE DISCLOSURE

Heavy metal pollutant ions are removed from an aqueous solution in a sulfide precipitation process that avoids generation of noxious amounts of hydrogen sulfide and the formation of soluble complexes of sulfide ions. Sulfide ion and a heavy metal ion that forms a sulfide having a higher equilibrium sulfide ion concentration than the sulfied of the heavy metal pollutant are added to the solution. The added heavy metal acts as a scavenger for excess sulfide. In some cases the added heavy metal and the heavy metal pollutant form co-precipitates which result in more complete removal of the pollutant ion than could be achieved by sulfide precipitation of the pollutant alone.

BACKGROUND OF THE INVENTION

This invention relates to a process for removing heavy metal pollutants from aqueous solutions by precipitation.

Soluble sulfides such as sodium sulfide have been used in the past to precipitate metal values from solutions. With proper controls, such separations are generally substantially quantitatively complete, however, prior art sulfide precipitation processes have certain disadvantages which have prevented their wide-spread adoption.

The most serious problem has been the formation of noxious quantities of hydrogen sulfide. Excess sulfide is usually added to insure complete precipitation of the heavy metal pollutant. The excess sulfide forms hydrogen sulfide gas, whose vapors are detectible even above highly dilute alkaline solutions.

In some cases, the use of excess sulfide, instead of leading to complete precipitation of the heavy metal pollutant, tends to form complex sulfide ions which remained in solution. Among the complex ions which may be formed in this manner are $HgS_2^=$, $SnS_3^=$ and $AgS^=$, which are formed according to the following equations:

$$HgS + S^= \rightarrow HgS_2^=$$
$$SnS_2 + S^= \rightarrow SnS_3^=$$
$$Ag + S^= \rightarrow AgS^-$$

Due to these undesirable secondary effects of sulfide precipitation processes, hydroxide precipitation has been used more widely than sulfide precipitation for the removal of heavy metals. Unfortunately, hydroxide precipitation is generally no longer as complete as sulfide precipitation because most metal bearing waste streams now contain complexing agents which have been used in conjunction with the heavy metal pollutants and which in large measure stabilize the pollutant ions against hydroxide but not against sulfide precipitation.

OBJECTS OF THE INVENTION

An object of this invention is to provide a process for precipitating heavy metal pollutants from an aqueous solution without generating noxious quantities of hydrogen sulfide.

Another object is to provide a sulfide precipitation process which avoids the formation of soluble complex sulfide ions.

Still another object is to provide a sulfide precipitation process in which co-precipitated, mixed metal sulfide compounds are formed.

Yet another object is to provide a precipitation process for removing heavy metals from aqueous solutions which is more effective than commercially available hydroxide precipitation processes.

Other objects and advantages of this invention will be apparent from the following description.

SUMMARY OF THE INVENTION

In the processes of this invention, sulfide ion and a heavy metal ion that forms a sulfide having a higher equilibrium sulfide ion concentration than the sulfide of the heavy metal pollutant to be removed are added to the aqueous solution to be treated. Since the sulfide of the added heavy metal is more soluble than the sulfide of the pollutant, the heavy metal pollutant ions are precipitated in preference to the added heavy metal ions. However, the added heavy metal ions act as a scavenger for excess sulfide, thereby preventing the formation of noxious amounts of hydrogen sulfide and complex sulfide ions. In addition, in certain cases, the added heavy metal promotes co-precipitation of insoluble mixed metal sulfide compounds that lead to lower pollutant concentration in the effluent.

DETAILED DESCRIPTION

In the preferred embodiment of this invention, a soluble salt of the heavy metal to be added is dissolved in the solution before the sulfide ion is introduced. The added heavy metal ion then acts as an excess sulfide scavenger when sulfide is added to precipitate the less soluble sulfide and prevents the generation of noxious quantities of hydrogen sulfide and formation of the aforementioned complexes.

The following table shows the sulfide ion concentrations for several of the more common heavy metal sulfides as calculated from their solubility products. The values are arranged in descending order of equilibrium sulfide ion concentration. Each metal ion can, therefore, be used as a scavenger for excess sulfide during precipitation of those metal ions lower in the table.

TABLE I

| Metal ion: | Equilibrium sulfide ion concentration (moles/l.) |
|---|---|
| $Mn^{++}$ | $3.75 \times 10^{-8}$ |
| $Fe^{++}$ | $6.1 \times 10^{-10}$ |
| $Zn^{++}$ | $3.46 \times 10^{-12}$ |
| $Ni^{++}$ | $1.18 \times 10^{-12}$ |
| $Sn^{++}$ | $3.1 \times 10^{-13}$ |
| $Co^{++}$ | $1.73 \times 10^{-13}$ |
| $Pb^{++}$ | $1.84 \times 10^{-14}$ |
| $Cd^{++}$ | $6.0 \times 10^{-15}$ |
| $Ag^+$ | $3.4 \times 10^{-17}$ |
| $Bi^{+++}$ | $4.8 \times 10^{-21}$ |
| $Cu^{++}$ | $9.2 \times 10^{-23}$ |
| $Hg^{++}$ | $4.5 \times 10^{-25}$ |

The choice of the heavy metal salt to be added to the solution to be treated depends upon what ions are to be removed from the solution, the use to which the water is to be put after it has been treated and such practical considerations as cost and availability of the various heavy metal salts. For most waste treatment applications it is desirable to use a heavy metal salt which is relatively non-toxic and generally innocuous since the water may subsequently be discharged to reservoirs where stringent water quality standards are observed. Salts of metals at the top of the foregoing table are preferred since they can precipitate a greater variety of pollutant ions. Manganese forms the most soluble of these sulfides, however, iron salts will frequently be preferable because they are generally cheaper than manganese salts.

After the added heavy metal salt is dissolved in the solution, a soluble sulfide is added to precipitate sulfides of the various metals. The process may be manipulated to selectively precipitate the ions at the bottom of Table I by adding just enough sulfide to precipitate the pollutant or pollutants which form the least soluble sulfides. Alternatively, a heavy metal salt which forms a sulfide of intermediate soubility; i.e., a sulfide that is more soluble than the sulfides to be precipitated but less soluble than the sulfides of some of the pollutants in the solution; may be used to achieve the same result. In general, however, a metal salt is chosen whose sulfide is more soluble than the sulfides of all of the pollutants and enough sulfide ion is added to precipitate all of these less soluble sulfides. Under equilibrium conditions, the resulting sulfide ion concentration is somewhere between $10^{-8}$ to $10^{-25}$ moles per liter, depending upon the pH of the solution and the solubility of the added heavy metal sulfide. If the soluble sulfide is introduced below the surface of the solution and agitation is sufficient to prevent a localized concentration of sulfide ions, the formation of the sulfide of the added heavy metal instantaneously reduces the sulfide ion concentration below the level at which it can form noxious amounts of hydrogen sulfide or soluble complex sulfides, while simultaneously allowing several orders of magnitude more sufide ion than that required to precipitate the metallic pollutants in the solution. As a result, no objectionable odors are created and, since soluble complex sulfide ions are not formed, substantially all of the metallic pollutants in the solution are precipitated.

Practically any sulfide which is more soluble than the metallic ions which are to be precipitated can be used as a source of sulfide ion. For reasons of availability and economy, sulfides such as sodium sulfide, sodium hydrosulfide and hydrogen sulfide are preferred. Hydrogen sulfide and sodium hydrosulfide may be used effectively in the process of this invention if a source of alkali such as sodium hydroxide is simultaneously added to maintain the pH in the preferred range of 7.0–8.0 and thereby prevent evolution of hydrogen sulfide gas.

The amounts of heavy metal salt and sulfide to be added to the solution will depend chiefly upon the quantity of pollutants to be precipitated. Preferred sulfide ion addition quantities will generally be between two to ten times the pollutant ion concentration. The excess heavy metal sulfide maintains a sulfide ion reservoir sufficiently large to be able to handle increases in pollutant ion loadings. Thus, assuming a waste stream of 10 p.p.m. of heavy metal ions, somewhere between 20 and 100 mg. of sulfide ion will be added per liter of solution to be treated.

The amount of heavy metal salt added to the solution is usually adjusted so that most, but not quite all, of the added heavy metal is precipitated as the sulfide along with the pollutant ions. This provides a slight excess of scavenger to prevent formation of free sulfide ion and its potential problems.

The precipitates produced by this process may be removed by filtration or by any of a number of conventional gravity separators, such as sedimentation basins, upflow sludge blanket clarifiers or rapid tube settlers. Coagulants such as ferric sulfate, clay, polyelectrolytes or the like may be added to facilitate removal of the precipitates. They may also be removed by flotation and filtration and the like.

In some cases, it may be desirable to add the heavy metal salt and the soluble sulfide simultaneously in order to simplify the equipment needed or to shorten the time required for addition of the materials. This can be done, provided that a certain amount of care is taken in order to insure that localized concentrations of sulfide ion do not develop. For example, increased agitation may be needed if simultaneous addition is employed.

Regardless of the mode of addition, the processes of this invention will frequently reduce the pollutant concentration below the levels that can be obtained by hydroxide precipitation processes, because many metal bearing wastes also contain complexing agents, which in large measure stabilize the pollutant ions against hydroxide, but not against sulfide precipitation.

With certain combinations of pollutants and added heavy metal salts, the removal of pollutants may be even more complete than would be theoretically expected from consideration of their solubility products, due to the co-precipitation of the pollutant ions and the added heavy metal ions. For example, if mercury, copper and/or nickel ions are to be removed from solution and the added heavy metal is iron; co-precipitated, mixed metallic sulfides such as FeS·HgS, FeS·NiS, and/or FeS·Cus may be formed. The formation of these mixed sulfides may reduce the mercury, copper and/or nickel level in the solution below the levels that could be achieved by simple sulfide precipitation of the mercury, copper and/or nickel ions alone.

In addition to precipitating metal ions that form sulfides directly, the processes of this invention can be used to eliminate certain pollutant ions, such as chromium (VI), which must be reduced before they will form insoluble precipitates. The thermodynamics of these reactions are not known precisely. A reasonable assumption, however, is embodied in the following equation:

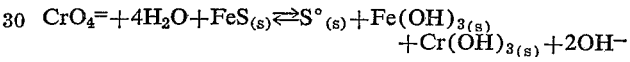

$$CrO_4^= + 4H_2O + FeS_{(s)} \rightleftharpoons S°_{(s)} + Fe(OH)_{3(s)} + Cr(OH)_{3(s)} + 2OH^-$$

In cases where a simple process is desired, chromium precipitation according to the processes of this invention is preferable to conventional hydroxide processes for elimination of chromium (VI) because a one step process can be employed. In conventional hydroxide processes, the pH of the solution is reduced to around 2 or 3. A reducing agent such as sulfur dioxide, a soluble sulfite or metabisulfite is then used to reduce the chromium (VI) to chromium (III). The pH of the solution is then raised to about 8 to precipitate chromium hydroxide. Thus, at least two steps are required whereas in the processes of this invention a one step process may be employed because the preferred pH for carrying out the reduction, i.e., 7.0–8.0, will suffice to substantially completely precipitate all $Cr(OH)_3$.

The following are representative examples of the precipitation of heavy metal ions according to the process of this invention.

EXAMPLE IA

In this test, the waste sample was a composite of all the discharges from an electronics plant. Due to the complex nature of the material, analysis for all metallic impurities was regarded as impractical. However, following sulfide and hydroxide treatment respectively the waste was analyzed for metals known to be initially present that are generally regarded as serious pollutants. These data are shown in Table II.

Prior to sulfide treatment, the waste was hypochlorinated at a pH of about 8.5 to destroy $NH_3$. Using a 1700 ml. sample of hypochlorinated waste, the excess $ClO^-$ was destroyed by the addition of 0.8 g. of sodium sulfite ($Na_2SO_3$) and after five minutes of agitation, the waste was further treated with 0.58 g. of manganous sulfate monohydrate ($MnSO_4·H_2O$) followed by 0.75 g. of sodium sulfide nonahydrate ($Na_2S·H_2O$). The treated waste was agitated for five minutes and then allowed to stand for one hour to allow the precipitates to settle. No hydrogen sulfide odors were detected during either the five minute agitation period or the one hour settling period. At the end of the one hour settling period, a sample of the supernatant was reserved for analysis.

EXAMPLE IB

In order to compare the processes of this invention with hydroxide precipitation, a sample whose composition was similar to the composition of the sample used in Example IA was treated as follows. A soluble hypochlorite was added to the water, which had a pH of 11.0, in order to convert cyanide ions known to be present to cyanate at which point metal hydroxides were precipitated. Sulfuric acid was then added to reduce the pH to 8.5 and convert the cyanate to nitrogen and bicarbonate. The material was allowed to stand for one hour after which the liquid was analyzed. The results, which are listed in Table II, show that precipitation by this method is not as complete as precipitation by the processes of this invention.

EXAMPLE IIA

In this test, waste from a printed circuit manufacturing operation containing 100 p.p.m. Cu, 7.7 p.p.m. Ni and 475 p.p.m. $NH_3$ was treated via the sulfide process. The pH of a 100 ml. sample was reduced to 7.7 with dilute $H_2SO_4$. A 0.123 g. dosage of ferrous ammonium sulfate was added immediately prior to 0.75 g. of $Na_2S \cdot 9H_2O$. The sample was agitated for five minutes and allowed to stand for one hour. No hydrogen sulfide odors were detected during either the five minute agitation period or the one hour settling period. At the end of the one hour settling period, the effluent was analyzed for copper and found to contain 1.8 p.p.m.

EXAMPLE IIB

The same waste used in Example IIA was adjusted to pH 7.7, the sample agitated and settled as described in IIA. It was found to contain 95.8 p.p.m. Cu and 5.9 p.p.m. Ni. This demonstrates the complexing power of $NH_3$ and the problems it presents in hydroxide precipitation processes.

EXAMPLE IIIA–IIIB

The tests performed in Examples IIA and IIB were repeated except that 40 p.p.m. $Fe_2(SO_4)_3$ and 8 p.p.m. of an anionic polyacrylamide were added to coagulate the precipitates and the sample used in the hydroxide test was chlorinated to destroy the $NH_3$. As can be seen from Table II, the results for sulfide precipitation, even in the presence of $NH_3$, were as good as the results produced by hydroxide precipitation after chlorination.

EXAMPLE IVA

The waste used in this experiment contained 4.8 p.p.m. of Cr(VI) and 3.5 p.p.m. of Zn. The pH was adjusted to 7.7. Then 382 mg. of $Fe_2SO_4$ and 333 mg. of $Na_2S \cdot 9HO_2$ were dissolved in small amounts of water and added simultaneously from separate pipettes. The sample was agitated for one minute, 100 p.p.m. of clay and 2 p.p.m. of an anionic polyacrylamide were added and slow agitation continued for an additional minute. The sample was then allowed to stand for one minute. Again, no hydrogen sulfide odors were detected during agitation or settling. The effluent contained negligible amounts of Cr(VI) and 0.03 p.p.m. Zn.

EXAMPLE IVB

A 1 liter sample of the same waste as in Example IVA containing 4.8 p.p.m. of Cr(VI) was adjusted to pH 2.0 with dilute sulfuric acid. A .0195 g. dosage of $Na_2SO_3$ was added with vigorous agitation. The pH of the reduced chromium solution was raised to 8.0 with dilute NaOH and the sludge was allowed to settle for 1 hour. A sample of the supernatant analyzed 0.05 p.p.m. residual Cr(VI) and 2.0 p.p.m. residual $Zn^{++}$. Thus, it can be seen that precipitation of chromium according to the processes of this invention is far superior to conventional hydroxide precipitation and may be accomplished more simply.

The results obtained in the foregoing sulfide and hydroxide precipitation processes are compared in the following table.

TABLE II

| Example No. | Waste composition in p.p.m. | Pollutant residues from— Sulfide precipitation in p.p.m. | Hydroxide precipitation in p.p.m. |
|---|---|---|---|
| IA–IB | Unknown | Cu, 0.1 | 0.8 |
| | | Zn, negligible | 2.0 |
| IIA–IIB | Cu, 100 | Cu, 1.8 | 95.8 |
| | Ni, 7.7 | | 5.9 |
| | $NH_3$, 475 | | |
| IIIA–IIIB | $NH_3$, 475 | Cu, 0.4 | 1.0 |
| | | Ni, 2.0 | 2.0 |
| IVA–IVB | Cr(VI), 4.8 | Cr(VI), negligible | 0.05 |
| | Zn, 3.5 | Zn, 0.03 | 2.0 |

These examples demonstrate a few of the many applications in which the processes of this invention may be used advantageously. It should be understood that these examples and the rest of the foregoing description are merely illustrative and are not intended to limit the scope of this invention, which is delineated by the appended claims.

We claim:

1. A method of precipitating heavy metal pollutant ions from an aqueous solution comprising:
   (a) adding a soluble salt of a heavy metal that forms a sulfide having a higher equilibrium sulfide ion concentration than the sulfide of the heavy metal pollutant to the solution; and
   (b) adding enough soluble sulfide to the solution to precipitate the heavy metal pollutant ions but less than the amount required to precipitate both the heavy metal pollutant ions and the added heavy metal ions, whereby the heavy metal pollutant ions are precipitated in preference to the heavy metal ion added to the solution.

2. A method according to claim 1 wherein the soluble sulfide is added after the soluble salt of the added heavy metal.

3. A method according to claim 1 wherein the soluble sulfide and the salt of the added heavy metal are added to the solution simultaneously.

4. A method according to claim 1 wherein the amount of soluble sulfide added is slightly less than the amount required to precipitate the added heavy metal ions.

5. A method according to claim 1 wherein the added heavy metal salt is an iron salt or a manganese salt.

6. A method according to claim 1 wherein the soluble sulfide is selected from the group consisting of sodium sulfide, sodium hydrosulfide and hydrogen sulfide.

7. A method according to claim 1 wherein the amount of sulfide ion added is approximately 2 to 10 times the amount of heavy metal pollutant ions in the solution.

8. A method according to claim 1 wherein the heavy metal pollutant ions and the added heavy metal form an insoluble mixed sulfide compound.

References Cited

UNITED STATES PATENTS

| | | | |
|---|---|---|---|
| 2,346,320 | 4/1944 | Moran et al. | 210—52 |
| 1,633,621 | 6/1927 | Blumenfeld | 210—53 |
| 1,908,545 | 5/1933 | Schwab et al. | 210—50 |
| 1,557,188 | 10/1925 | Newlands | 210—53 |
| 1,276,644 | 8/1918 | Goldschmidt | 210—50 |

SAMIH N. ZAHARNA, Primary Examiner

T. G. WYSE, Assistant Examiner

UNITED STATES PATENT OFFICE
CERTIFICATE OF CORRECTION

Patent No. 3,740,331         Dated June 19, 1973

Inventor(s) John R. Anderson, Charles O. Weiss

It is certified that error appears in the above-identified patent and that said Letters Patent are hereby corrected as shown below:

Column 5, Line 22, "0.75g" should be -- 0.075g --.

Signed and sealed this 12th day of March 1974.

(SEAL)
Attest:

EDWARD M. FLETCHER, JR.　　　　　　　C. MARSHALL DANN
Attesting Officer　　　　　　　　　　　Commissioner of Patents